United States Patent [19]

Matoba

[11] Patent Number: 5,759,934
[45] Date of Patent: Jun. 2, 1998

[54] DIELECTRIC CERAMIC COMPOSITION

[75] Inventor: Hiroaki Matoba, Moriyama, Japan

[73] Assignee: Murata Manufacturing Co., Ltd., Kyoto-fu, Japan

[21] Appl. No.: 824,820

[22] Filed: Mar. 26, 1997

[30] Foreign Application Priority Data

Mar. 26, 1996 [JP] Japan .................................. 8-070298

[51] Int. Cl.$^6$ .................................................. C04B 35/472
[52] U.S. Cl. .................................................. 501/134
[58] Field of Search .......................... 501/134, 133; 252/62.9

[56] References Cited

U.S. PATENT DOCUMENTS

| | | | |
|---|---|---|---|
| 5,006,956 | 4/1991 | Kawakita et al. | 501/136 |
| 5,093,757 | 3/1992 | Kawakita et al. | 501/136 |
| 5,288,474 | 2/1994 | Reichert et al. | 252/62.9 |
| 5,402,791 | 4/1995 | Saitoh et al. | 252/62.9 |
| 5,500,142 | 3/1996 | Ushida et al. | 252/62.9 |
| 5,668,071 | 9/1997 | Kashiwaya et al. | 252/62.9 |

FOREIGN PATENT DOCUMENTS

| | | |
|---|---|---|
| 368619 | 5/1990 | European Pat. Off. . |
| 63-288917 | 11/1988 | Japan . |

OTHER PUBLICATIONS

Database—Derwent Publications Ltd., AN 88–009889, & JP 62 272 403, Nov. 26, 1987, Abstract.
Database—Derwent Publications Ltd., AN 86–223085, & JP 61 155 246, Jul. 14, 1986, Abstract.

*Primary Examiner*—Deborah Jones
*Attorney, Agent, or Firm*—Ostrolenk, Faber, Gerb & Soffen LLP

[57] ABSTRACT

Disclosed herein is a dielectric ceramic composition based on a lead-based perovskite-type complex compound containing nickel, characterized in that the amount of nickel is smaller than the stoichiometric amount. The dielectric ceramic composition can contain $\alpha$ mol % ($0 < \alpha \leq 100$) of lead-based perovskite-type complex compound represented by the formula below $$Pb[Ni_{(1-x)/3}A_{2/3}]_a[Ni_{(1-y)/2}D_{1/2}]_{(1-a)}O_3$$

where A denotes at least one element selected from elements having a valance of +5, D denotes at least one element selected from elements having a valance of +6, $0 < x < 1$, $0 < y < 1$, and $0 \leq a \leq 1$, with the amount of nickel being $\gamma$ mol % ($0 < \gamma \leq 20$) which is smaller than the stoichiometric amount (where $\gamma = \alpha \times (a \times x \times 1/3 + (1-a) \times y \times 1/2)$). The dielectric ceramics composition which has a high dielectric constant and yet has nearly constant capacity-temperature characteristics.

15 Claims, No Drawings

DIELECTRIC CERAMIC COMPOSITION

BACKGROUND OF THE INVENTION

1. Field of the Invention

The present invention relates to a dielectric ceramics compound.

2. Description of the Related Art

Barium titanate series ceramics have been in general use as a high dielectric material in electronic parts such as for ceramic capacitors. Unfortunately, they have such a high firing temperature (1300°–1400° C.) that laminated ceramic capacitors employing these need internal electrodes of expensive platinum or palladium.

Although there have been available materials having nearly temperature-independent properties, they are not suitable for capacitors because of their low dielectric constant (about 2000 at the highest).

There has recently been reported lead-based perovskite-type complex compounds as a high dielectric material capable of sintering at low temperatures. These include ternary ones composed of lead magnesium-niobate $Pb(Mg_{1/3}Nb_{2/3})O_3$, lead nickel-niobate $Pb(Ni_{1/3}Nb_{2/3})O_3$, and lead titanate $PbTiO_3$. These have an extremely high dielectric constant but suffer the disadvantage of fluctuating somewhat in the value with temperature.

OBJECT AND SUMMARY OF THE INVENTION

The present invention was completed in view of the foregoing. It is an object of the present invention to provide a dielectric ceramics composition which has nearly constant capacity-temperature characteristics despite its high dielectric constant.

DESCRIPTION OF THE PREFERRED EMBODIMENTS

The dielectric ceramics composition of the present invention is based on a lead-based perovskite-type complex compound containing nickel which is characterized in that the amount of nickel is smaller than the stoichiometric amount.

In a preferred embodiment of the present invention, the dielectric ceramics composition contains $\alpha$ mol % ($0<\alpha\leq100$, preferably $10\leq\alpha\leq52$) of a lead-based perovskite-type complex compound represented by the formula below

(where A denotes at least one element having a valance of +5, D denotes at least one element having a valance of +6, $0<x<1$, $0<y<1$, $0\leq a\leq 1$, with the amount of nickel being $\gamma$ mol % ($0<\gamma\leq25$, preferably $0.48\leq\alpha\leq20$) which is smaller than the stoichiometric amount (where $\gamma=\alpha\times(a\times x\times\frac{1}{3}+(1-a)\times y\times\frac{1}{2})$).

In the following, the embodiments of the present invention are explained.

The dielectric ceramics composition of the present invention is based on a lead-based perovskite-type complex compound containing nickel which is characterized in that the amount of nickel is smaller than the stoichiometric amount.

The fact that the amount of nickel is smaller than the stoichiometric amount required to form the perovskite structure is responsible for the dielectric ceramics composition which has nearly constant capacity-temperature characteristics despite its high dielectric constant.

An example of the dielectric ceramic composition according to the present invention is one which is based on a lead-based perovskite-type complex compound represented by the formula below

where A denotes at least one element having a valance of +5, D denotes at least one element having a valance of +6, $0<x<1$, $0<y<1$, and $0\leq a\leq1$. A and D in the formula above are exemplified by Nb and Ta, and W, respectively.

The dielectric ceramic composition may contain the above-mentioned lead-based perovskite-type complex compound in an amount of $\alpha$ mol % ($0<\alpha\leq100$), in which case the amount of nickel should be $\gamma$ mol % ($0<\gamma\leq25$) and which is smaller than the stoichiometric amount (where $\gamma=\alpha\times(a\times x\times\frac{1}{3}+(1-a)\times y\times\frac{1}{2})$).

If the amount of nickel exceeds about 20 mol %, the resulting composition would have a dielectric constant lower than 3000. If the amount of nickel is zero, the resulting composition would have an extremely low dielectric constant which is not desirable. The amount of nickel should preferably be $\gamma$ mol %, with $\gamma$ most preferably in the range of $0<\gamma\leq10$.

The invention will be described in more detail with reference to the following examples which are not intended to restrict the scope of the invention.

EXAMPLES

Samples of the dielectric ceramic composition of the present invention were prepared according to different formulations.

Each sample was prepared from $Pb_3O_4$, NiO, $Nb_2O_5$, $TiO_2$, MnO, CuO and $WO_3$, whose amounts were so selected as to establish the desired composition. These starting materials were mixed by wet ball-milling. The resulting mixture was dried and then calcined at 750° C. for 2 hours. The resulting powder (100 pbw) was mixed with vinyl acetate (5 pbw) as a binder by wet ball-milling. The resulting mixture was dried and crushed into powder. The powder was formed into a disk, 10 mm in diameter and 1.2 mm thick, by compression under a pressure of 2.5 t/cm². The disk was fired in an atmosphere of Pb by using an electric furnace. The fired disk was provided with an electrode formed from Ag paste by baking.

The thus prepared sample was measured for dielectric constant ($\epsilon$) and dielectric loss (tan $\delta$) at 1 kHz, 1 V, and 20° C. The sample was also measured for resistivity, with a voltage of 250 V applied for 2 minutes. The sample was tested for capacity-temperature characteristics at 1 kHz and 1 V. The capacity-temperature characteristics is expressed as the change (%) in capacity that occurs when the temperature is raised or lowered by 50° C. from the reference temperature at which the capacity is maximum. The expression in this manner is more convenient for comparison of samples than the rate of change in capacity at −25° C. and +85° C. because some samples have the transition point away from normal temperature.

The samples vary in the amounts of principal and auxiliary components, the firing temperature, and the electrical properties as shown in Tables 1 to 8. Incidentally, the amount (wt %) of auxiliary components is based on the amount (as 100%) of principal components.

In Table 1 to 8, $\alpha$ denotes the lead-based perovskite-type complex compound containing nickel and $\beta1$ and $\beta2$ denote a lead-based perovskite-type complex compound not containing nickel.

Each amount (in mol %) of α, β1, and β2 are such that their total amount is 100 mol %, although their ratio is arbitrary.

TABLE 1

| | Lead-based perovskite-type complex compound containing nickel $\alpha = Pb[Ni_{(1-x)/3}A_{2/3}]_a[Ni_{(1-y)/2}D_{1/2}]_{(1-a)}O_3$ $\gamma = \alpha \times (a \times x \times 1/3 + (1-a) \times y \times 1/2)$ | | | | | | Lead-based perovskite-type complex compound not containing nickel | | | |
|---|---|---|---|---|---|---|---|---|---|---|
| Sample No. | α (mol %) | a | x | A | y | D | γ | β1 | mol % | β2 mol % |
| 1 * | 72 | 1 | −0.04 | Nb | | | −0.96 | PbTiO₃ | 28 | |
| 2 * | 72 | 1 | 0 | Nb | | | 0.00 | PbTiO₃ | 28 | |
| 3 | 72 | 1 | 0.02 | Nb | | | 0.48 | PbTiO₃ | 28 | |
| 4 | 72 | 1 | 0.04 | Nb | | | 0.96 | PbTiO₃ | 28 | |
| 5 | 72 | 1 | 0.06 | Nb | | | 1.44 | PbTiO₃ | 28 | |
| 6 | 72 | 1 | 0.12 | Nb | | | 2.88 | PbTiO₃ | 28 | |
| 7 | 72 | 1 | 0.2 | Nb | | | 4.80 | PbTiO₃ | 28 | |
| 8 | 72 | 1 | 0.3 | Nb | | | 7.20 | PbTiO₃ | 28 | |
| 9 | 72 | 1 | 0.5 | Nb | | | 12.00 | PbTiO₃ | 28 | |
| 10 | 72 | 1 | 0.7 | Nb | | | 16.80 | PbTiO₃ | 28 | |
| 11 | 72 | 1 | 0.9 | Nb | | | 21.60 | PbTiO₃ | 28 | |
| 12 * | 50 | 0.4 | 0 | Nb | | W | 0.00 | PbTiO₃ | 50 | |
| 13 | 50 | 0.4 | 0.06 | Nb | 0.06 | W | 1.30 | PbTiO₃ | 50 | |

TABLE 2

| Sample No. | Amounts of auxiliary components | | | Firing temperature (°C.) | Dielectric constant | Dielectric loss (%) | Resistivity (Ω cm) | Change of capacity at reference temperature minus 50° C. (%) | Change of capacity at reference temperature plus 50° C. (%) |
|---|---|---|---|---|---|---|---|---|---|
| | wt % | | wt % | | | | | | |
| 1 * | MnO | 0.1 | Pb(Cu₁/₂W₁/₂)O₃ | 3 | 1000 | 14200 | 0.22 | 7.9 × 10¹² | −50.2 | −32.2 |
| 2 * | MnO | 0.1 | Pb(Cu₁/₂W₁/₂)O₃ | 3 | 1000 | 13600 | 0.25 | 7.6 × 10¹² | −46.3 | −28.0 |
| 3 | MnO | 0.1 | Pb(Cu₁/₂W₁/₂)O₃ | 3 | 1000 | 12100 | 0.51 | 6.8 × 10¹² | −34.2 | −25.4 |
| 4 | MnO | 0.1 | Pb(Cu₁/₂W₁/₂)O₃ | 3 | 1000 | 10300 | 0.62 | 6.9 × 10¹² | −15.8 | −24.1 |
| 5 | MnO | 0.1 | Pb(Cu₁/₂W₁/₂)O₃ | 3 | 1000 | 9200 | 0.65 | 5.1 × 10¹² | −16.2 | −23.2 |
| 6 | MnO | 0.1 | Pb(Cu₁/₂W₁/₂)O₃ | 3 | 1000 | 7900 | 0.70 | 5.5 × 10¹² | −15.7 | −21.5 |
| 7 | MnO | 0.1 | Pb(Cu₁/₂W₁/₂)O₃ | 3 | 1000 | 6800 | 0.74 | 4.9 × 10¹² | −14.2 | −17.2 |
| 8 | MnO | 0.1 | Pb(Cu₁/₂W₁/₂)O₃ | 3 | 1000 | 5400 | 1.23 | 4.2 × 10¹² | −11.2 | −12.1 |
| 9 | MnO | 0.1 | Pb(Cu₁/₂W₁/₂)O₃ | 3 | 1000 | 4300 | 1.30 | 3.6 × 10¹² | −10.5 | −11.2 |
| 10 | MnO | 0.1 | Pb(Cu₁/₂W₁/₂)O₃ | 3 | 1000 | 3200 | 1.35 | 3.1 × 10¹² | −8.6 | −9.8 |
| 11 | MnO | 0.1 | Pb(Cu₁/₂W₁/₂)O₃ | 3 | 1000 | 2500 | 1.41 | 3.2 × 10¹² | −7.9 | −8.7 |
| 12 * | | | | | 1000 | 9600 | 2.30 | 2.7 × 10¹² | −38.6 | −30.5 |
| 13 | | | | | 1050 | 7200 | 2.39 | 3.5 × 10¹² | −32.5 | −28.6 |

TABLE 3

| | Lead-based perovskite-type complex compound containing nickel $\alpha = Pb[Ni_{(1-x)/3}A_{2/3}]_a[Ni_{(1-y)/2}D_{1/2}]_{(1-a)}O_3$ $\gamma = \alpha \times (a \times x \times 1/3 + (1-a) \times y \times 1/2)$ | | | | | | | Lead-based perovskite-type complex compound not containing nickel | | | |
|---|---|---|---|---|---|---|---|---|---|---|---|
| Sample No. | α (mol %) | a | x | A | y | D | γ | β1 | mol % | β2 | mol % |
| 14 * | 45 | 1 | 0 | Nb | | | 0.00 | PbTiO₃ | 25 | Pb(Mg₁/₃Nb₂/₃)O₃ | 30 |
| 15 | 45 | 1 | 0.04 | Nb | | | 0.60 | PbTiO₃ | 25 | Pb(Mg₁/₃Nb₂/₃)O₃ | 30 |
| 16 | 45 | 1 | 0.1 | Nb | | | 1.50 | PbTiO₃ | 25 | Pb(Mg₁/₃Nb₂/₃)O₃ | 30 |
| 17 | 45 | 1 | 0.2 | Nb | | | 3.00 | PbTiO₃ | 25 | Pb(Mg₁/₃Nb₂/₃)O₃ | 30 |
| 18 | 45 | 1 | 0.3 | Nb | | | 4.50 | PbTiO₃ | 25 | Pb(Mg₁/₃Nb₂/₃)O₃ | 30 |
| 19 | 45 | 1 | 0.35 | Nb | | | 5.25 | PbTiO₃ | 25 | Pb(Mg₁/₃Nb₂/₃)O₃ | 30 |
| 20 * | 70 | 1 | 0 | Nb | | | 0.00 | PbTiO₃ | 25 | Pb(Mg₁/₃Nb₂/₃)O₃ | 5 |
| 21 | 70 | 1 | 0.06 | Nb | | | 1.40 | PbTiO₃ | 25 | Pb(Mg₁/₃Nb₂/₃)O₃ | 5 |
| 22 | 70 | 1 | 0.2 | Nb | | | 4.67 | PbTiO₃ | 25 | Pb(Mg₁/₃Nb₂/₃)O₃ | 5 |
| 23 | 70 | 1 | 0.4 | Nb | | | 9.33 | PbTiO₃ | 25 | Pb(Mg₁/₃Nb₂/₃)O₃ | 5 |
| 24 | 70 | 1 | 0.8 | Nb | | | 18.67 | PbTiO₃ | 25 | Pb(Mg₁/₃Nb₂/₃)O₃ | 5 |
| 25 | 70 | 1 | 0.9 | Nb | | | 21.00 | PbTiO₃ | 25 | Pb(Zn₁/₃Nb₂/₃)O₃ | 5 |
| 26 * | 70 | 1 | 0 | Nb | | | 0.00 | PbTiO₃ | 20 | Pb(Zn₁/₃Nb₂/₃)O₃ | 5 |
| 27 | 70 | 1 | 0.06 | Nb | | | 1.40 | PbTiO₃ | 20 | Pb(Mg₁/₃Nb₂/₃)O₃ | 5 |

TABLE 4

| Sample No. | Amounts of auxiliary components | wt % | | wt % | Firing temperature (°C.) | Dielectric constant | Dielectric loss (%) | Resistivity (Ω cm) | Change of capacity at reference temperature minus 50° C. (%) | Change of capacity at reference temperature plus 50° C. (%) |
|---|---|---|---|---|---|---|---|---|---|---|
| 14 * | $Pb(Mn_{1/3}Nb_{2/3})O_3$ | 1 | | | 1050 | 11000 | 1.24 | $2.9 \times 10^{12}$ | −34.0 | −44.9 |
| 15 | $Pb(Mn_{1/3}Nb_{2/3})O_3$ | 1 | | | 1050 | 9400 | 1.51 | $2.7 \times 10^{12}$ | −33.0 | −39.0 |
| 16 | $Pb(Mn_{1/3}Nb_{2/3})O_3$ | 1 | | | 1050 | 7800 | 1.56 | $2.5 \times 10^{12}$ | −26.7 | −24.5 |
| 17 | $Pb(Mn_{1/3}Nb_{2/3})O_3$ | 1 | | | 1050 | 5400 | 1.64 | $2.6 \times 10^{12}$ | −20.6 | −19.5 |
| 18 | $Pb(Mn_{1/3}Nb_{2/3})O_3$ | 1 | | | 1050 | 3700 | 1.63 | $2.2 \times 10^{12}$ | −14.6 | −15.3 |
| 19 | $Pb(Mn_{1/3}Nb_{2/3})O_3$ | 1 | | | 1050 | 2900 | 2.10 | $1.9 \times 10^{12}$ | −9.5 | −10.2 |
| 20 | | | | | 1050 | 9300 | 2.23 | $2.8 \times 10^{12}$ | −38.9 | −42.3 |
| 21 | | | | | 1050 | 8300 | 2.45 | $3.9 \times 10^{12}$ | −35.6 | −32.1 |
| 22 | | | | | 1050 | 7400 | 2.52 | $2.7 \times 10^{12}$ | −29.4 | −27.6 |
| 23 | | | | | 1050 | 5200 | 2.51 | $2.4 \times 10^{12}$ | −15.2 | −20.1 |
| 24 | | | | | 1050 | 3400 | 2.64 | $1.9 \times 10^{12}$ | −12.5 | −15.7 |
| 25 * | | | | | 1050 | 1700 | 2.71 | $1.5 \times 10^{12}$ | −9.4 | −13.1 |
| 26 | $Pb(Mn_{1/3}Nb_{2/3})O_3$ | 0.5 | $Pb(Cu_{1/2}W_{1/2})O_3$ | 2 | 1000 | 10500 | 0.29 | $7.2 \times 10^{12}$ | −46.0 | −29.1 |
| 27 | $Pb(Mn_{1/3}Nb_{2/3})O_3$ | 0.5 | $Pb(Cu_{1/2}W_{1/2})O_3$ | 2 | 1000 | 9400 | 0.58 | $6.9 \times 10^{12}$ | −36.1 | −17.8 |

TABLE 5

| Sample No. | Lead-based perovskite-type complex compound containing nickel $\alpha = Pb[Ni_{(1-x)/3}A_{2/3}]_a[Ni_{(1-y)/2}D_{1/2}]_{(1-a)}O_3$ $\gamma = \alpha \times (a \times x \times 1/3 + (1-a) \times y \times 1/2)$ | | | | | | Lead-based perovskite-type complex compound not containing nickel | | | |
|---|---|---|---|---|---|---|---|---|---|---|
| | α (mol %) | a | x | A | y | D | γ | β1 | mol % | β2 | mol % |
| 28 * | 65 | 1 | 0 | Nb | | | 0.00 | $PbTiO_3$ | 15 | $PbZrO_3$ | 20 |
| 29 | 65 | 1 | 0.05 | Nb | | | 1.08 | $PbTiO_3$ | 15 | $PbZrO_3$ | 20 |
| 30 * | 40 | 1 | 0 | Nb | | | 0.00 | $PbTiO_3$ | 30 | $Pb(Fe_{2/3}W_{1/3})O_3$ | 30 |
| 31 | 40 | 1 | 0.08 | Nb | | | 1.07 | $PbTiO_3$ | 30 | $Pb(Fe_{2/3}W_{1/3})O_3$ | 30 |
| 32 * | 40 | 1 | 0 | Nb | | | 0.00 | $Pb(Mg_{1/3}Nb_{2/3})O_3$ | 10 | $Pb(Zn_{1/3}Nb_{2/3})O_3$ | 50 |
| 33 | 40 | 1 | 0.08 | Nb | | | 1.07 | $Pb(Mg_{1/3}Nb_{2/3})O_3$ | 10 | $Pb(Zn_{1/3}Nb_{2/3})O_3$ | 50 |
| 34 | 40 | 1 | 0.2 | Nb | | | 2.67 | $Pb(Mg_{1/3}Nb_{2/3})O_3$ | 10 | $Pb(Zn_{1/3}Nb_{2/3})O_3$ | 50 |
| 35 | 40 | 1 | 0.4 | Nb | | | 5.33 | $Pb(Mg_{1/3}Nb_{2/3})O_3$ | 10 | $Pb(Zn_{1/3}Nb_{2/3})O_3$ | 50 |
| 36 * | 10 | 0 | | | 0 | W | 0.00 | $Pb(Mg_{1/3}Nb_{2/3})O_3$ | 40 | $Pb(Zn_{1/3}Nb_{2/3})O_3$ | 50 |
| 37 | 10 | 0 | | | 0.1 | W | 0.50 | $Pb(Mg_{1/3}Nb_{2/3})O_3$ | 40 | $Pb(Zn_{1/3}Nb_{2/3})O_3$ | 50 |
| 38 | 10 | 0 | | | 0.4 | W | 2.00 | $Pb(Mg_{1/3}Nb_{2/3})O_3$ | 40 | $Pb(Zn_{1/3}Nb_{2/3})O_3$ | 50 |
| 39 * | 20 | 0 | | | 0 | W | 0.00 | $PbTiO_3$ | 25 | $Pb(Mg_{1/2}Nb_{1/2})O_3$ | 55 |
| 40 | 20 | 0 | | | 0.1 | W | 1.00 | $PbTiO_3$ | 25 | $Pb(Mg_{1/3}Nb_{2/3})O_3$ | 55 |
| 41 * | 20 | 0 | | | 0 | W | 0.00 | $PbTiO_3$ | 25 | $Pb(Mg_{1/3}Nb_{2/3})O_3$ | 55 |
| 42 | 20 | 0 | | | 0.1 | W | 1.00 | $PbTiO_3$ | 25 | $Pb(Mg_{1/3}Nb_{2/3})O_3$ | 55 |
| 43 | 20 | 0 | | | 0.3 | W | 3.00 | $PbTiO_3$ | 25 | $Pb(Mg_{1/3}Nb_{2/3})O_3$ | 55 |
| 44 | 20 | 0 | | | 0.5 | W | 5.00 | $PbTiO_3$ | 25 | $Pb(Mg_{1/3}Nb_{2/3})O_3$ | 55 |

TABLE 6

| Sample No. | Amounts of auxiliary components | wt % | | wt % | Firing temperature (°C.) | Dielectric constant | Dielectric loss (%) | Resistivity (Ω cm) | Change of capacity at reference temperature minus 50° C. (%) | Change of capacity at reference temperature plus 50° C. (%) |
|---|---|---|---|---|---|---|---|---|---|---|
| 28 * | $Pb(Cu_{1/2}W_{1/2})O_3$ | 3 | | | 1000 | 9300 | 0.53 | $4.6 \times 10^{12}$ | −46.9 | −24.7 |
| 29 | $Pb(Cu_{1/2}W_{1/2})O_3$ | 3 | | | 1000 | 8500 | 0.61 | $3.8 \times 10^{12}$ | −41.1 | −20.1 |
| 30 * | MnO | 0.1 | $Pb(Cu_{1/2}W_{1/2})O_3$ | 3 | 1000 | 5700 | 3.29 | $7.8 \times 10^{12}$ | −120.0 | −95.1 |
| 31 | MnO | 0.1 | $Pb(Cu_{1/2}W_{1/2})O_3$ | 3 | 1000 | 3700 | 4.07 | $5.6 \times 10^{12}$ | −101.2 | −88.1 |
| 32 * | MnO | 0.1 | $Pb(Cu_{1/2}W_{1/2})O_3$ | 3 | 1000 | 9200 | 3.10 | $7.6 \times 10^{12}$ | −25.6 | −35.7 |
| 33 | MnO | 0.1 | $Pb(Cu_{1/2}W_{1/2})O_3$ | 3 | 1000 | 7300 | 3.33 | $8.1 \times 10^{12}$ | −22.1 | −25.6 |
| 34 | MnO | 0.1 | $Pb(Cu_{1/2}W_{1/2})O_3$ | 3 | 1000 | 6500 | 3.56 | $7.9 \times 10^{12}$ | −15.6 | −14.5 |
| 35 | MnO | 0.1 | $Pb(Cu_{1/2}W_{1/2})O_3$ | 3 | 1000 | 4300 | 4.23 | $6.8 \times 10^{12}$ | −8.6 | −10.2 |
| 36 * | | | | | 1050 | 8500 | 2.90 | $4.8 \times 10^{12}$ | −28.6 | −23.6 |
| 37 | | | | | 1050 | 7600 | 3.10 | $4.3 \times 10^{12}$ | −20.5 | −18.6 |
| 38 | | | | | 1050 | 5400 | 3.56 | $3.6 \times 10^{12}$ | −15.6 | −14.2 |
| 39 * | $Pb(Mn_{1/3}Nb_{2/3})O_3$ | 1 | | | 1000 | 11000 | 5.60 | $3.9 \times 10^{12}$ | −48.6 | −49.3 |
| 40 | $Pb(Mn_{1/3}Nb_{2/3})O_3$ | 1 | | | 1000 | 9200 | 6.50 | $3.7 \times 10^{12}$ | −39.1 | −38.9 |

TABLE 6-continued

| Sample No. | Amounts of auxiliary components | wt % | | wt % | Firing temperature (°C.) | Dielectric constant | Dielectric loss (%) | Resistivity (Ω cm) | Change of capacity at reference temperature minus 50° C. (%) | Change of capacity at reference temperature plus 50° C. (%) |
|---|---|---|---|---|---|---|---|---|---|---|
| 41 * | $Pb(Mn_{1/2}W_{1/2})O_3$ | 1.5 | | | 1000 | 9800 | 4.30 | $4.9 \times 10^{12}$ | −45.3 | −46.8 |
| 42 | $Pb(Mn_{1/2}W_{1/2})O_3$ | 1.5 | | | 1000 | 8200 | 4.70 | $4.3 \times 10^{12}$ | −30.5 | −30.8 |
| 43 | $Pb(Mn_{1/2}W_{1/2})O_3$ | 1.5 | | | 1000 | 6300 | 5.32 | $2.3 \times 10^{12}$ | −19.7 | −24.5 |
| 44 | $Pb(Mn_{1/2}W_{1/2})O_3$ | 1.5 | | | 1000 | 4900 | 5.95 | $1.5 \times 10^{12}$ | −11.3 | −12.4 |

TABLE 7

| Sample No. | Lead-based perovskite-type complex compound containing nickel $\alpha = Pb[Ni_{(1-x y/3}A_{2/3})_a[Ni_{(1-y)/2}D_{1/2}]_{(1-a)}O_3$ $\gamma = \alpha \times (a \times x \times \frac{1}{3} + (1 - a) \times y \times \frac{1}{2})$ | | | | | | | Lead-based perovskite-type complex compound not containing nickel | | | |
|---|---|---|---|---|---|---|---|---|---|---|---|
| | α (mol %) | a | x | A | y | D | γ | β1 | mol % | β2 | mol % |
| 45 * | 30 | 1 | 0 | Nb | | | 0.00 | $Pb(Fe_{1/2}Nb_{1/2})O_3$ | 70 | | |
| 46 | 30 | 1 | 0.1 | Nb | | | 1.00 | $Pb(Fe_{1/2}Nb_{1/2})O_3$ | 70 | | |
| 47 | 30 | 1 | 0.3 | Nb | | | 3.00 | $Pb(Fe_{1/2}Nb_{1/2})O_3$ | 70 | | |
| 48 | 30 | 1 | 0.5 | Nb | | | 5.00 | $Pb(Fe_{1/2}Nb_{1/2})O_3$ | 70 | | |
| 49 * | 50 | 0.4 | 0 | Nb, Ta | 0 | W | 0.00 | $PbTiO_3$ | 50 | | |
| 50 | 50 | 0.4 | 0.08 | Nb, Ta | 0.04 | W | 1.13 | $PbTiO_3$ | 50 | | |
| 51 * | 45 | 1 | 0 | Nb, Ta | | | 0.00 | $PbTiO_3$ | 25 | $Pb(Mg_{1/3}Nb_{2/3})O_3$ | 30 |
| 52 | 45 | 1 | 0.06 | Nb, Ta | | | 0.90 | $PbTiO_3$ | 25 | $Pb(Mg_{1/3}Nb_{2/3})O_3$ | 30 |

TABLE 8

| Sample No. | Amounts of auxiliary components | wt % | | wt % | Firing temperature (°C.) | Dielectric constant | Dielectric loss (%) | Resistivity (Ω cm) | Change of capacity at reference temperature minus 50° C. (%) | Change of capacity at reference temperature plus 50° C. (%) |
|---|---|---|---|---|---|---|---|---|---|---|
| 45 * | MnO | 0.1 | $Pb(Cu_{1/2}W_{1/2})O_3$ | 3 | 1000 | 17200 | 0.34 | $4.5 \times 10^{12}$ | −45.7 | −57.8 |
| 46 | MnO | 0.1 | $Pb(Cu_{1/2}W_{1/2})O_3$ | 3 | 1000 | 13800 | 0.40 | $4.3 \times 10^{12}$ | −35.6 | −32.5 |
| 47 | MnO | 0.1 | $Pb(Cu_{1/2}W_{1/2})O_3$ | 3 | 1000 | 5800 | 0.58 | $2.9 \times 10^{12}$ | −24.5 | −19.8 |
| 48 | MnO | 0.1 | $Pb(Cu_{1/2}W_{1/2})O_3$ | 3 | 1000 | 3200 | 0.89 | $1.9 \times 10^{12}$ | −14.3 | −12.1 |
| 49 * | | | | | 1070 | 9300 | 2.35 | $2.6 \times 10^{12}$ | −37.5 | −30.8 |
| 50 | | | | | 1070 | 6900 | 2.63 | $2.9 \times 10^{12}$ | −33.4 | −27.6 |
| 51 * | $Pb(Mn_{1/3}Nb_{2/3})O_3$ | 1 | | | 1070 | 10800 | 1.54 | $3.6 \times 10^{12}$ | −35.0 | −45.3 |
| 52 | $Pb(Mn_{1/3}Nb_{2/3})O_3$ | 1 | | | 1070 | 9100 | 1.63 | $2.9 \times 10^{12}$ | −32.1 | −38.6 |

In Tables 1 to 8, comparative samples are marked with a star. Comparative samples Nos. 1 and 2 correspond to samples Nos. 3 to 11. Comparative sample No. 12 corresponds to sample No. 13. Comparative sample No. 14 corresponds to samples Nos. 15 to 19. Comparative sample No. 20 corresponds to samples Nos. 21 to 25. Comparative sample No. 26 corresponds to sample No. 27. Comparative sample No. 28 corresponds to sample No. 29. Comparative sample No. 32 corresponds to samples Nos. 33 to 35. Comparative sample No. 36 corresponds to samples Nos. 37 and 38. Comparative sample No. 30 corresponds to samples Nos. 31 and 32. Comparative sample No. 35 corresponds to samples Nos. 36 to 38. Comparative sample No. 39 corresponds to sample No. 40. Comparative sample No. 41 corresponds to samples Nos. 42 to 44. Comparative sample No. 45 corresponds to samples Nos. 46 to 48. Comparative sample No. 49 corresponds to sample No. 50. Comparative sample No. 51 corresponds to sample No. 52.

It is apparent from Tables 2, 4, 6, and 8 that the samples decrease in temperature dependence of capacity while keeping the dielectric constant as the amount of nickel deviates from the stoichiometric amount. All the samples excel their corresponding comparative samples.

The dielectric ceramics composition of the present invention is based on a lead-based perovskite-type complex compound containing nickel which is characterized in that the amount of nickel is smaller than the stoichiometric amount. Therefore, it has a high dielectric constant and yet has nearly constant capacity-temperature characteristics.

What is claimed is:

1. A dielectric ceramic composition comprising a lead-based perovskite-type complex compound containing nickel in which the amount of nickel is smaller than the stoichiometric amount and in which said lead-based perovskite-type complex compound is represented by the formula $$Pb(Ni_{(1-x y/3}A_{2/3})_a(Ni_{(1-y)/2}D_{1/2})_{(1-a)}O_3$$

where A denotes at least one element having a valance of +5, D denotes at least one element having a valance of +6, $0<x<1$, $0<y<1$, $0 \leq a \leq 1$, and the amount of nickel is $\gamma$ mol % which is smaller than the stoichiometric amount, where $\gamma=\alpha\times(a\times x\times\frac{1}{3}+(1-a)\times y\times\frac{1}{2})$, $0<\alpha\leq 100$ and $0<\gamma\leq 25$.

2. A dielectric ceramic composition as defined in claim 1 in which A is Nb or Ta, and D is W.

3. A dielectric ceramic composition as defined in claim 2 in which $\gamma \leq 20$.

4. A dielectric ceramic composition as defined in claim 3 in which $0.48 \leq \gamma \leq 10$.

5. A dielectric ceramic composition as defined in claim 3 in which $0 < \gamma \leq 10$.

6. A dielectric ceramic composition as defined in claim 5 in which said lead-based perovskite-type complex compound is less than 100 mol % of said dielectric ceramic composition.

7. A dielectric ceramic composition as defined in claim 6 in which said lead-based perovskite-type complex compound is about 10 to 52% of said composition.

8. A dielectric ceramic composition as defined in claim 2 in which said lead-based perovskite-type complex compound is less than 100 mol % of said dielectric ceramic composition.

9. A dielectric ceramic composition as defined in claim 8 in which said lead-based perovskite-type complex compound is about 10 to 52% of said composition.

10. A dielectric ceramic composition as defined in claim 1 in which said lead-based perovskite-type complex compound is less than 100 mol % of said dielectric ceramic composition.

11. A dielectric ceramic composition as defined in claim 10 in which said lead-based perovskite-type complex compound is about 10 to 52% of said composition.

12. A dielectric ceramic composition as defined in claim 1 in which $\gamma \leq 20$.

13. A dielectric ceramic composition as defined in claim 12 in which $0.48 \leq \gamma \leq 10$.

14. A dielectric ceramic composition as defined in claim 12 in which $0 < \gamma \leq 10$.

15. A dielectric ceramic composition as defined in claim 12 in which said lead-based perovskite-type complex compound is about 10 to 52% of said composition.

* * * * *